United States Patent
Myers et al.

(10) Patent No.: US 8,738,688 B2
(45) Date of Patent: May 27, 2014

(54) SYSTEM AND METHOD FOR ENABLING CONTROL OF MOBILE DEVICE FUNCTIONAL COMPONENTS

(75) Inventors: Jesse Myers, San Francisco, CA (US); Scott Hotes, Berkeley, CA (US); Richard Michael Fromm, Berkeley, CA (US); Joseph Anakata, Alameda, CA (US); Anthony Polito, San Francisco, CA (US); Eli Reese Bishop, San Francisco, CA (US)

(73) Assignee: WaveMarket, Inc., Emeryville, CA (US)

( * ) Notice: Subject to any disclaimer, the term of this patent is extended or adjusted under 35 U.S.C. 154(b) by 337 days.

(21) Appl. No.: 13/217,093

(22) Filed: Aug. 24, 2011

(65) Prior Publication Data

US 2013/0054674 A1 Feb. 28, 2013

(51) Int. Cl.
- *G06F 15/16* (2006.01)
- *G06F 15/177* (2006.01)
- *G06F 15/173* (2006.01)

(52) U.S. Cl.
USPC ............ 709/203; 709/220; 709/224; 709/248

(58) Field of Classification Search
USPC .................. 709/203, 220, 224, 248
See application file for complete search history.

(56) References Cited

U.S. PATENT DOCUMENTS

| | | | |
|---|---|---|---|
| 4,956,825 A | 9/1990 | Wilts et al. | |
| 5,882,258 A | 3/1999 | Kelly et al. | |
| 5,973,683 A | 10/1999 | Cragun et al. | |
| 6,690,940 B1 | 2/2004 | Brown et al. | |
| 7,705,726 B2 | 4/2010 | Graves et al. | |
| 7,876,704 B1 | 1/2011 | Bims et al. | |
| 8,095,175 B2 | 1/2012 | Todd et al. | |
| 8,107,432 B2 | 1/2012 | Seo | |
| 8,225,413 B1 | 7/2012 | De et al. | |
| 8,351,408 B2 | 1/2013 | Daigle | |
| 8,594,065 B2 | 11/2013 | Polito et al. | |
| 2003/0005306 A1* | 1/2003 | Hunt et al. | ..................... 713/181 |
| 2003/0211889 A1 | 11/2003 | Walker et al. | |

(Continued)

FOREIGN PATENT DOCUMENTS

FR 2863439 6/2005

OTHER PUBLICATIONS

Office Action dated Jun. 21, 2013 for U.S. Appl. No. 13/470,321.
Office Action dated Jan. 16, 2013 for U.S. Appl. No. 13/087,302.

(Continued)

*Primary Examiner* — Hee Soo Kim
(74) *Attorney, Agent, or Firm* — Dovas Law, P.C.

(57) ABSTRACT

A system is provided including a non-transitory computer readable storage medium that causes a mobile device to store client states indicating statuses of mobile device functional components. Each client state corresponds to a functional component. A client digest of the client state is stored. A server digest corresponding to a server state and the client digest is received from a server. The server state indicates a status of a mobile device functional component. The server digest is compared with the client digest. A state request is transmitted to the server responsive to a determination of a difference between the server digest and client digest. The server state is received from the server. The functional component is enabled or disabled as indicated by the server state. The server state and digest are stored as the client state and digest respectively. Methods for control of mobile device functional components are also provided.

35 Claims, 11 Drawing Sheets

(56) References Cited

U.S. PATENT DOCUMENTS

| | | |
|---|---|---|
| 2005/0003895 A1 | 1/2005 | Nara |
| 2006/0270476 A1 | 11/2006 | Denkewicz |
| 2007/0039624 A1 | 2/2007 | Roberts et al. |
| 2008/0201441 A1 | 8/2008 | Bodic et al. |
| 2009/0002147 A1 | 1/2009 | Bloebaum et al. |
| 2009/0017750 A1 | 1/2009 | Marcinkiewicz |
| 2009/0055938 A1 | 2/2009 | Samuel |
| 2009/0089876 A1 | 4/2009 | Finamore et al. |
| 2009/0181356 A1 | 7/2009 | Dasgupta |
| 2009/0204471 A1 | 8/2009 | Elenbaas et al. |
| 2009/0248436 A1 | 10/2009 | Takagi et al. |
| 2009/0271247 A1 | 10/2009 | Karelin et al. |
| 2009/0298019 A1 | 12/2009 | Rogan et al. |
| 2010/0028844 A1 | 2/2010 | Wiseman |
| 2010/0106573 A1 | 4/2010 | Gallagher et al. |
| 2010/0210254 A1 | 8/2010 | Kelly et al. |
| 2010/0330543 A1 | 12/2010 | Black et al. |
| 2011/0047078 A1 | 2/2011 | Ginter et al. |
| 2011/0055546 A1 | 3/2011 | Klassen et al. |
| 2011/0093161 A1 | 4/2011 | Zhou et al. |
| 2011/0151830 A1 | 6/2011 | Blanda et al. |
| 2011/0275321 A1 | 11/2011 | Zhou et al. |
| 2011/0294520 A1 | 12/2011 | Zhou et al. |
| 2011/0296014 A1 | 12/2011 | Cancel et al. |
| 2011/0307434 A1 | 12/2011 | Rostampour et al. |
| 2012/0001548 A1 | 1/2012 | Recker et al. |
| 2012/0081500 A1 | 4/2012 | Border et al. |
| 2012/0110071 A1 | 5/2012 | Zhou et al. |
| 2012/0166285 A1 | 6/2012 | Shapiro et al. |
| 2012/0171990 A1 | 7/2012 | Williams et al. |
| 2012/0172100 A1 | 7/2012 | Colar et al. |
| 2012/0188163 A1 | 7/2012 | Xiao |
| 2012/0223861 A1 | 9/2012 | Kupfer et al. |
| 2012/0244883 A1 | 9/2012 | Tibbits et al. |
| 2012/0253918 A1 | 10/2012 | Marois |
| 2012/0323990 A1* | 12/2012 | Hayworth .................... 709/203 |
| 2013/0111510 A1 | 5/2013 | Baker et al. |
| 2013/0143512 A1 | 6/2013 | Hernandez et al. |
| 2013/0143521 A1 | 6/2013 | Hernandez et al. |
| 2013/0185411 A1 | 7/2013 | Martin |
| 2013/0217363 A1 | 8/2013 | Myers |
| 2013/0303106 A1 | 11/2013 | Martin |
| 2013/0305384 A1 | 11/2013 | Weiss |

OTHER PUBLICATIONS

Office Action dated Dec. 20, 2013 for U.S. Appl. No. 13/470,321.

* cited by examiner

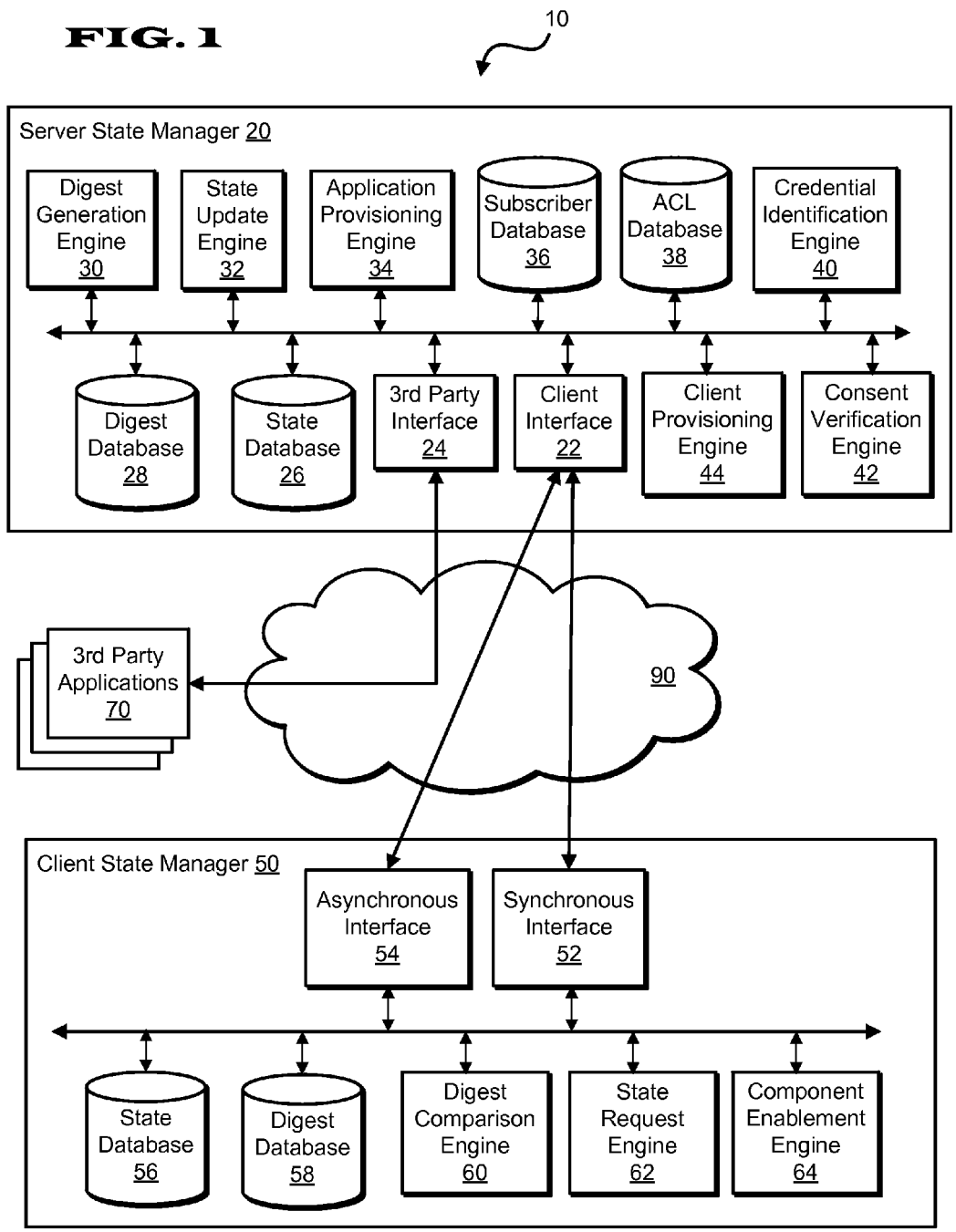

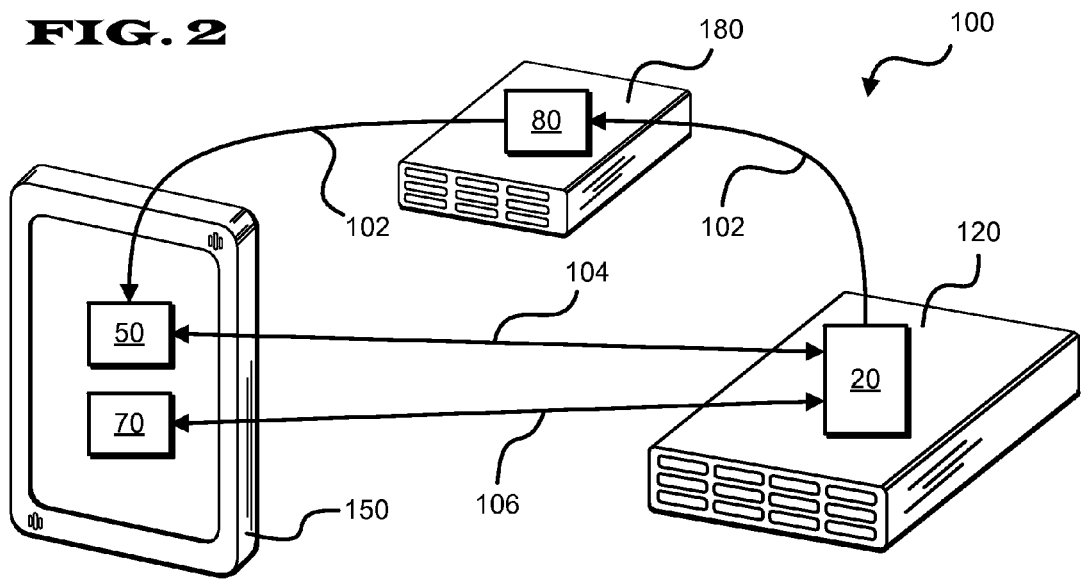
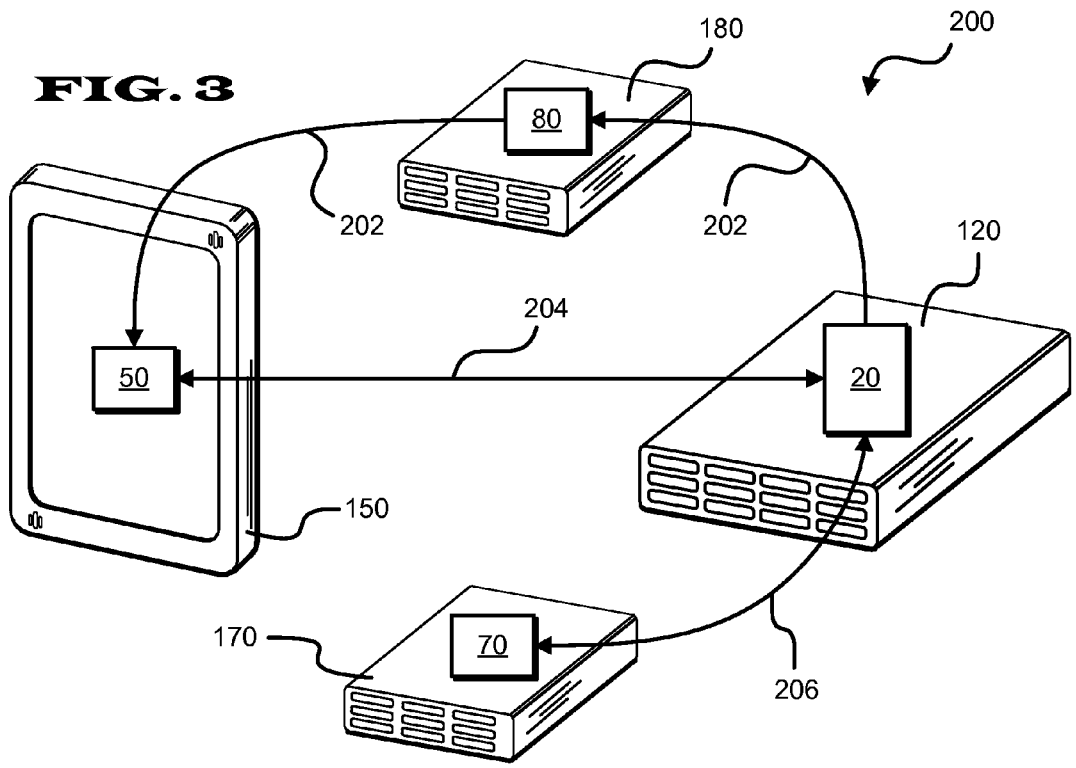

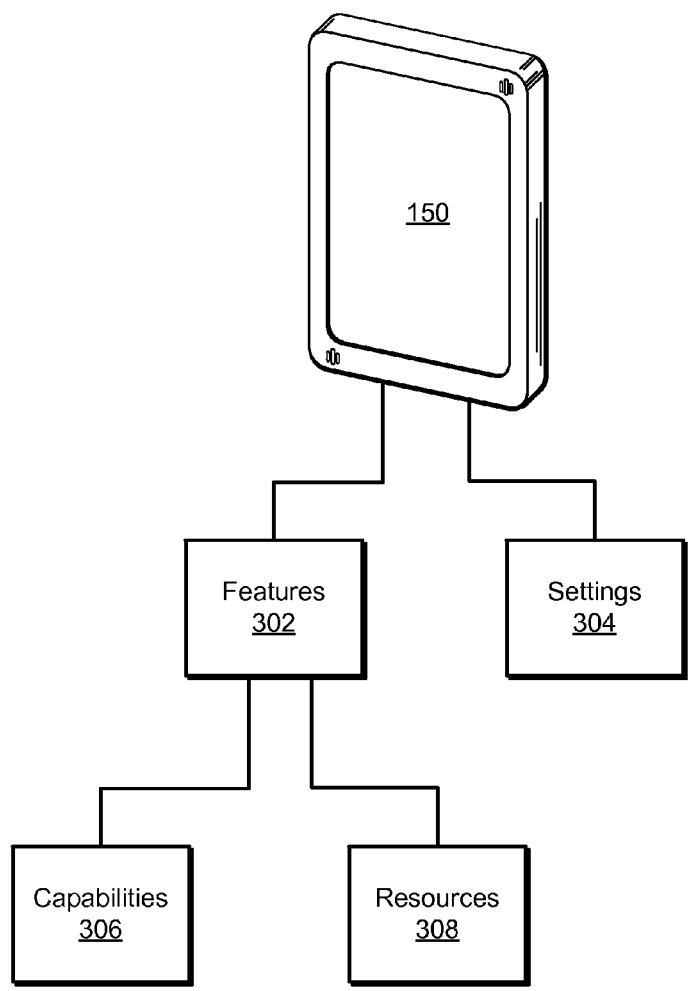

SYSTEM AND METHOD FOR ENABLING CONTROL OF MOBILE DEVICE FUNCTIONAL COMPONENTS

FIELD OF INVENTION

The present invention is generally related to wired and wireless communications.

BACKGROUND

The growing ubiquity of locatable mobile devices such as mobile telephones, smart phones, cellular-enabled personal computers and GPS systems has created a demand for applications offering novel content on mobile devices. Known applications exist to provide games, social networking, navigation assistance, locating of points of interest, location tracking, advertising, and consumer and business-related services via a user's mobile device.

Developers of applications for mobile devices are often burdened by the complexity in designing applications which function effectively no matter the type of mobile device or the telecommunication carrier servicing the mobile device. An application typically needs to control mobile device functionality and retrieving data from a particular mobile device. However, effecting mobile device control and aggregating and maintaining data required for application functionality is often too complex and time consuming to make application development worthwhile and cost effective. It would be desirable to provide a system which facilitates the development and maintenance of applications for mobile devices by addressing issues of complexity in mobile device control and data collection.

SUMMARY

A system is provided comprising a non-transitory computer readable storage medium having encoded thereon instructions that, when executed on a processor of a mobile device, cause the mobile device to perform a process. The process includes storing a plurality of client states indicating statuses of functional components of the mobile device, wherein each of the plurality of client states corresponds to at least one of the functional components. For each of the plurality of client states, a client digest of the client state is stored on the mobile device. Periodic transmissions of a particular server digest are received via the network from a server, which particular server digest corresponds to a particular one of a plurality of server states maintained by the server, and which server states indicate statuses of functional components of the mobile device, wherein the particular server digest further corresponds to one of the plurality of client digests. The particular server digest is compared with the corresponding client digest. A state request corresponding to the particular one of a plurality of server states is transmitted to the server via a network responsive to a determination of a difference between the particular server digest and the corresponding client digest. The particular one of the plurality of server states is received from the server via the network. At least one of the functional components is enabled or disabled as indicated by the received particular one of the plurality of server states. The received particular one of the plurality of server states is stored as the corresponding client state; and the received particular server digest is stored as the corresponding client digest.

A method is provided for enabling control of mobile device functional components. The method includes storing with a server within the network a plurality of server states and a plurality of server digests respectively corresponding to the plurality of server states, wherein the server states and the server digests correspond to a particular mobile device. A plurality of client states are stored with the mobile device indicating statuses of functional components of the mobile device, wherein each of the plurality of client states corresponds to at least one of the functional components. For each of the plurality of client states, a client digest of the client state is stored with the mobile device. A request to modify the status of at least one of the functional components of the mobile device is received with the server from an application via the network. The method further includes updating with the server at least one of the server states and at least one of the server digests corresponding to the at least one of the functional components of the mobile device responsive to the request from the application to modify the status of the at least one of the functional components. The at least one updated server digest is transmitted from the server to the mobile device via the network. The at least one updated server digest is received with the mobile device via the network from the server, wherein the at least one updated server digest corresponds to at least one of the client digests. The at least one updated server digest is compared with the corresponding at least one client digest with the mobile device. A state request corresponding to the at least one updated server state is transmitted from the mobile device to the server via the network responsive to a determination of a difference between the at least one updated server digest and the corresponding at least one client digest. The state request is received with the server from the mobile device. The at least one updated server state is transmitted from the server to the mobile device. The at least one updated server state is received with the mobile device from the server via the network. At least one of the functional components is enabled or disabled with the mobile device as indicated by the received at least one updated server state. The received at least one updated server state is stored with the mobile device as the corresponding at least one client state, and the received at least one updated server digest is stored with the mobile device as the corresponding at least one client digest.

Another method is provided for enabling control of mobile device functional components. The method includes providing a server within a network, wherein the server comprises at least one computing system within the network. A plurality of server states and a plurality of server digests respectively corresponding to the plurality of server states corresponding to a particular mobile device are stored with the server. A request to modify the status of at least one of the functional components of the particular mobile device is received with the server from an application via the network. At least one server state and at least one server digest corresponding to the at least one of the functional components of the particular mobile device are updated with the server responsive to the request from the application to modify the status of the at least one of the functional components. The at least one updated server digest is transmitted with the server to the particular mobile device. A state request corresponding to the at least one updated server state is received with the server from the particular mobile device; and at least one updated server state is transmitted to the particular mobile device responsive to the state request.

BRIEF DESCRIPTION OF THE DRAWING(S)

The foregoing Summary as well as the following detailed description will be readily understood in conjunction with the appended drawings which illustrate embodiments of the invention. In the drawings:

FIG. 1 shows an operating environment including a server state manager and a client state manager.

FIGS. 2 and 3 are diagrams depicting example implementations of the client state manager and the server state manager of FIG. 1.

FIG. 4 is a diagram depicting example functional components supported by a particular mobile device implementing the client state manager of FIG. 1.

DETAILED DESCRIPTION OF THE INVENTION

Figure 5A:
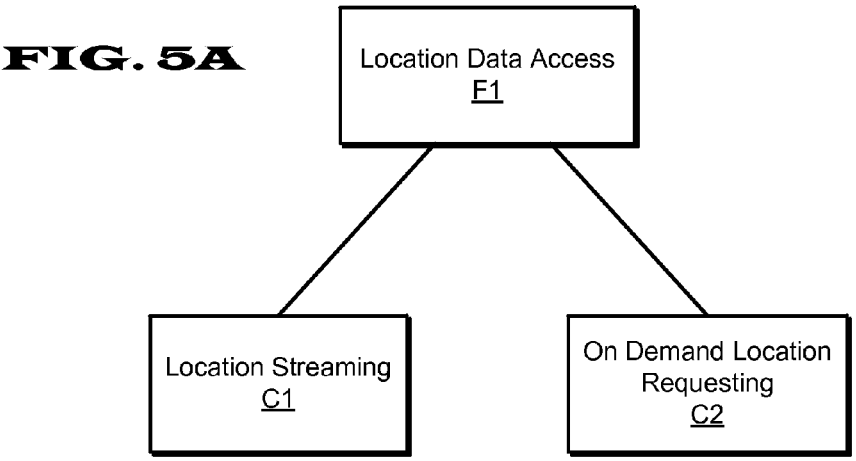
FIGS. 5A and 5B are diagrams depicting relationships between example functional components supported by a particular mobile device implementing the client state manager of FIG. 1.

Referring to FIG. 1, a schematic illustration is shown of an exemplary operating environment 10 in which a server state manager 20 functions in a communications network 90, preferably including one or more wired or wireless networks or a combination thereof. The server state manager 20 and its constituent elements are preferably implemented on a server via hardware components, software components sharing one or more processing units, or a suitable combination thereof. As described herein, a server is a computer system or a plurality of computer systems integrally constructed or connected via a network. The server state manager 20 has a client interface 22 and a third party interface 24. The client interface 22 interfaces with a client state manager 50 via a synchronous interface 52 and an asynchronous interface 54. The third party interface 24 is configured to interface with a third party application 70. The client state manager 50 is preferably implemented via encoded instructions on a mobile device, which mobile device preferably functions as a wireless transmitting and receiving device with cellular telephone functionality, and which instructions can be hardware or software enabled. The third party application 70 can reside on the mobile device on which the client state manager 50 is implemented. Alternatively, the third party application 70 can reside on a separate computer system in communication with the server state manager 20 via the communications network 90.

The client state manager 50 includes a functional component enablement engine 64 which is configured to enable and disable functional components of a mobile device implementing the client state manager 50. Functional components of a mobile device preferably include software or hardware driven features, settings, capabilities and resources. Different mobile devices may correspond to different functional components.

The client interface 22 preferably implements a Representational State Transfer styled application program interface ("RESTful API") for communication with the client state manager 50. The server state manager 20 further exposes functional components of a mobile device implementing the client state manager 50 to a participating third party application 70 via the third party interface 24 using a another RESTful API. Alternatively, other suitable application program interface architecture can be leveraged for server state manager communications.

The server state manager 20 includes a server state database 26 which stores states which indicate statuses of functional components of each mobile device implementing the client state manager 50. The statuses of the functional components of the mobile device can comprise an indication of whether a particular functional component is enabled or disabled or an indication of one or more scheduled time periods when a particular functional component is enabled or disabled. The statuses of the functional components can further include a particular set of modifiable parameters. A server digest database 28 stores a digest for each of the states. Each digest is preferably determined via a hash function applied to elements of a respective state by a digest generation engine 30. The client state manager 50 includes a client state database 56 which stores states and a client digest database 58 which stores digests respectively corresponding to the stored states, which states and digest are received from the server state manager 20. For the purpose of clarity, states and digests corresponding to a particular mobile device and stored by the server state manager 20 are respectively termed "server states" and "server digests", and server states and server digests received from the server state manager 20 and stored by the client state manager 50 are respectively termed "client states" and "client digests".

The server state manager 20 is configured to receive from a third party application 70 via the third party interface 24 a request to modify the status of one or more functional components of a particular mobile device implementing the client state manager 50. An application's request to modify a functional component status can come in the form of a preference indication, for example "turn on mobile device location streaming" or "turn off mobile device location streaming". An application's request can further include modification of one or more parameters of a functional component. The server state manager 20 uses the state update engine 32 to update one or more server states respectively corresponding to the one or more of the functional components responsive to the request from the third party application 70 to modify the status of the functional components. When a particular server state is updated, a corresponding server digest is updated via the digest generation engine 30. Further, a particular functional component can be related to other functional components, wherein an application's request to modify the status of a particular functional component triggers the update of the state and digest corresponding to the particular functional component and one or more states and digests corresponding to one or more related functional components.

In response to server state and server digest updates, updated server digests are transmitted from the server state manager 20 via the client interface 22 to a mobile device implementing the client state manager 50. The server state manager 20 is configured to transmit updated server digests to the mobile device in asynchronous communications via the asynchronous interface 54 of the client state manager 50, for example using Short Message Service ("SMS") protocol. The client state manager 50 compares each received server digest with its corresponding client digest using the digest comparison engine 60. If a difference between a particular server digest and the corresponding client digest is detected, a state request corresponding to the particular state is generated by a state request engine 62, and the state request is transmitted to the server state manager 20 via the client interface 22.

State requests are preferably made by the client state manager 50 in a synchronous communication via the synchronous interface 52, for example using Hypertext Transfer Protocol Secure ("HTTPS"). The server state manager 20 transmits via the client interface 22 a particular server state responsive to a corresponding state request in a synchronous communication, which is preferably the synchronous communication in which the state request was transmitted. The transmitted server state can be the same updated server state represented by the server digest transmitted to the client state manager 50 in the asynchronous communication indicated above. Alternatively, if the updated server state has been re-updated since the asynchronous transmission of the corresponding server digest, the re-updated server state can be transmitted to the client state manager 50. The server state is preferably transmitted along with the corresponding current digest in the synchronous communication, and the received state and digest are stored in the respective client state database and client digest database 58. Transmitting the most current digest in the synchronous communication is important since it is possible that the particular server state and corresponding server digest may have been re-updated by the state update engine 32 of the server state manager 20 since the updated digest was transmitted to the client state manager 50 in the asynchronous communication. Further, additional server digests corresponding to functional components related to the particular functional component can be transmitted with the state and digest of the particular functional component responsive to the state request. Thereafter, the client state manager's digest comparison engine 60 compares each received additional server digest with its corresponding client digest and transmits another state request if a difference is determined between an additional server digest and its corresponding client digest, and the server state manager 20 thereafter returns one or more states corresponding to the new state request.

The client state manager 50 uses the functional component enablement engine 64 to enable or disable a functional component as indicated by the received corresponding server state. The received server state is stored by the client state manager 50 as the corresponding client state in the client state database 56, preferably overwriting the existing corresponding client state. Similarly, the received server digest is stored by the client state manager 50 as the corresponding client digest in the client digest database 58, preferably overwriting the existing corresponding client digest.

Referring to FIG. 2, an example implementation 100 of the invention is shown in which the third party application 70 resides on a mobile device 150 on which the client state manager 50 is implemented. The server state manager 20 is implemented on a state server 120. A message aggregation server 180 executing a message aggregator 80, for example a Short Message Service ("SMS") aggregator or Short Message Service Center ("SMSC"), disseminates asynchronous communications 102, for example SMS messages, from the server state manager 20 to the client state manager 50, for example via a wireless telecommunications network. Synchronous communications 104, 106, for example implementing HTTPS through a data network, are initiated between the client state manager 50 and the server state manager 20 and between the third party application 70 and the server state manager 20, respectively.

Referring to FIG. 3, in another example implementation 200 of the invention the third party application 70 can alternatively reside away from the mobile device 150 on a separate computer system such as an application server 170 in communication with the server state manager 20, for example via a data network. The message aggregation server 180 disseminates asynchronous communications 202, for example SMS messages, from the server state manager 20 to the client state manager 50. Synchronous communications 204, 206 are initiated between the client state manager 50 and the server state manager 20 and between the third party application 70 and the server state manager 20, respectively.

As indicated above, functional components can include a mobile device's software or hardware driven features, settings, capabilities and resources. Tables 1-4 below respectively show example features, capabilities, settings and resources, with associated component numbers, which can be enabled and disabled by the functional component enablement engine 64 of the client state manager 50 on a particular mobile device. Alternatively other suitable functional components can be enabled by the client state manager 50. Table 5 below shows example parameters which can be set for particular features and capabilities via application request.

TABLE 1

| No. | Feature |
|---|---|
| F1 | Location data access |
| F2 | Short message service ("SMS") access |
| F3 | Multimedia messaging service ("MMS") access |
| F4 | Voice call access |
| F5 | Global positioning system ("GPS") access/control |
| F6 | Applications control |
| F7 | Contact access |
| F8 | Device interface locking control |
| F9 | Communication with device user |

TABLE 2

| No. | Setting |
|---|---|
| S1 | Networking retry time interval |
| S2 | Networking maximum number of retries |
| S3 | GPS timeout time |
| S4 | GPS maximum acceptable precision |
| S5 | Device interface locking triggering driving speed |
| S6 | Device interface locking triggering minimum travel distance |
| S7 | Mobile device heartbeat time interval |
| S8 | Network location timeout time |

TABLE 3

| No. | Capability | Parent Feature |
|---|---|---|
| C1 | Location Streaming | F1 (Location data access) |
| C2 | On demand location requesting | F1 |
| C3 | Gathering incoming SMS activity | F2 (SMS access) |
| C4 | Gathering outgoing SMS activity | F2 |
| C5 | Gathering incoming MMS activity | F3 (MMS access) |
| C6 | Gathering outgoing MMS activity | F3 |
| C7 | Gathering incoming voice call activity | F4 (Voice call access) |
| C8 | Gathering outgoing voice call activity | F4 |
| C9 | Detection of whether GPS is on or off | F5 (GPS access/control) |
| C10 | Forcing GPS on if off | F5 |
| C11 | Reporting of installed applications on client | F6 (Applications control) |
| C12 | Reporting of contacts | F7 (Contact access) |
| C13 | Locking interface based on time schedule | F8 (Device interface locking control) |
| C14 | Locking interface based on driving | F8 |
| C15 | Screen Messaging | F9 (Communication with device user) |

TABLE 4

| No. | Resource | Parent Feature |
|---|---|---|
| R1 | Main text for lock screen | F8 |
| R2 | Message text for lock screen | F8 |
| R3 | Auto reply text for lock screen | F8 |
| R4 | Override text for lock screen | F8 |
| R5 | Emergency text for lock screen | F8 |
| R6 | Background image for lock screen | F8 |
| R7 | Branding image for lock screen | F8 |
| R8 | Message regarding subscriber privacy | F9 |

TABLE 5

| No. | Parameter | Parent Feature/ Capability |
|---|---|---|
| P1 | Which mobile applications can run or be launched while interface is locked (e.g. a music playing application) | F8, C13, and C14 |
| P2 | Which phone numbers can interface-locked device continue to place calls to or receive calls from | F8, C13, and C14 |
| P3 | Which phone numbers can interface-locked device continue to receive messages (e.g. SMS) from | F8, C13, and C14 |
| P4 | Whether a hands free device connected to the interface-locked device (e.g. Bluetooth headset) can be used to place phone calls | F8, C13, and C14 |
| P5 | Whether an auto reply message is sent to a user/device sending a message (e.g. SMS) to the interface-locked device | F8, C13, and C14 |
| P6 | Message content | C15 |
| P7 | URL link associated with message | C15 |
| P8 | Whether to launch device web browser and connect to URL responsive to interaction with message | C15 |

Some functional components can be related to the extent that modification of the status of a particular functional component may result in modification in the status of one or more related functional components. Referring to FIG. 4 and Tables 1-4, a particular mobile device 150, can be enabled for example with features 302, settings 304, capabilities 306 and resources 308. Particular features 302 are related to particular capabilities 306 and particular resources 308, wherein modification of the status of a particular capability 306 or particular resource may result in modification of the status of a particular feature 302 or vice versa. Mobile device user-specific data ("subscriber-specific data"), for example mobile device location data, is disseminated by a mobile device based on status of the capabilities 306, which data is stored in a subscriber database 36 in the server state manager 20 for dissemination to an authorized third party application 70.

Referring to FIG. 5A, capabilities C1 (location streaming) and C2 (on demand location requesting), are related to feature F1 (location data access), wherein a change in status of feature F1 can result in a change in status of capability C1 or C2, or alternatively a change in status of capability C1 or C2 results in a change in status of feature F1. For example, a request from a third party application 70 to enable or disable feature F1, immediately or during a scheduled time period, causes the server state manager 20 to update the server states and server digests of feature F1 and capabilities C1 and C2 to reflect that features F1 and capabilities C1 and C2 are enabled or disabled. In another example a request from a third party application 70 to the server state manager 20 via the third party interface 24 to disable location streaming capability C1 causes the state update engine 32 to update the server state of capability C1 and causes the digest generation engine 30 to update the server digest of capability C1. The request further causes the server state manager 20 to update the server state and server digest of the location data access feature F1.

Figure 5B:
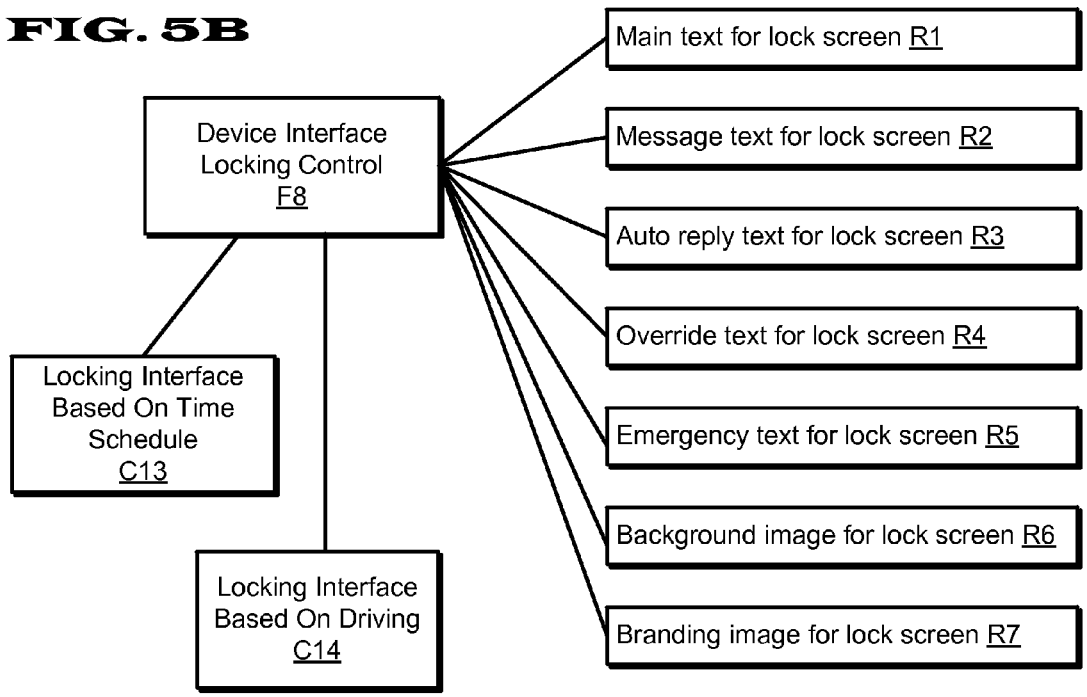

Referring to FIG. 5B, capabilities C13 (Locking interface based on time schedule) and C14 (Locking interface based on driving), and resources R1-R7 are related to feature F8 (Device interface locking control), wherein a change in status of feature F8 can result in a change in status of capability C13 or C14, or alternatively a change in status of capability C13 or C14 results in a change in status of feature F8. For example, a request from a third party application 70 to enable or disable the device interface locking control feature F8, immediately or during a scheduled time period, causes the server state manager 20 to update the server states and server digests of feature F8 and capabilities C13 and C14 to reflect that feature F8 and capabilities C13 and C14 are enabled or disabled. In another example a request from a third party application 70 to the server state manager 20 via the third party interface 24 to lock the mobile device interface during a particular time period via capability C13 causes the state update engine 32 to update the server state of capability C13 and causes the digest generation engine 30 to update the server digest of capability C13. The request further causes the server state manager 20 to update the server state and server digest of the device interface locking control feature F8.

In view of the above examples, capabilities C1 and C2 comprise a capability group which enables feature F1, and capabilities C13 and C14 and resources R1-R7 enable features F8. Referring to Table 3 capabilities C3 and C4 comprise a capability group which enables feature F2, capabilities C5 and C6 comprise a capability group which enables feature F3, capabilities C7 and C8 comprise a capability group which enables feature F4, capabilities C9 and C10 comprise a capability group which enables feature F5, capability C11 enables feature F6, capability C12 enables feature F7, capabilities C13 and C14 and resources R1-R7 enable feature F8, capability C15 and resource R8 enable feature F9.

Figure 5C:
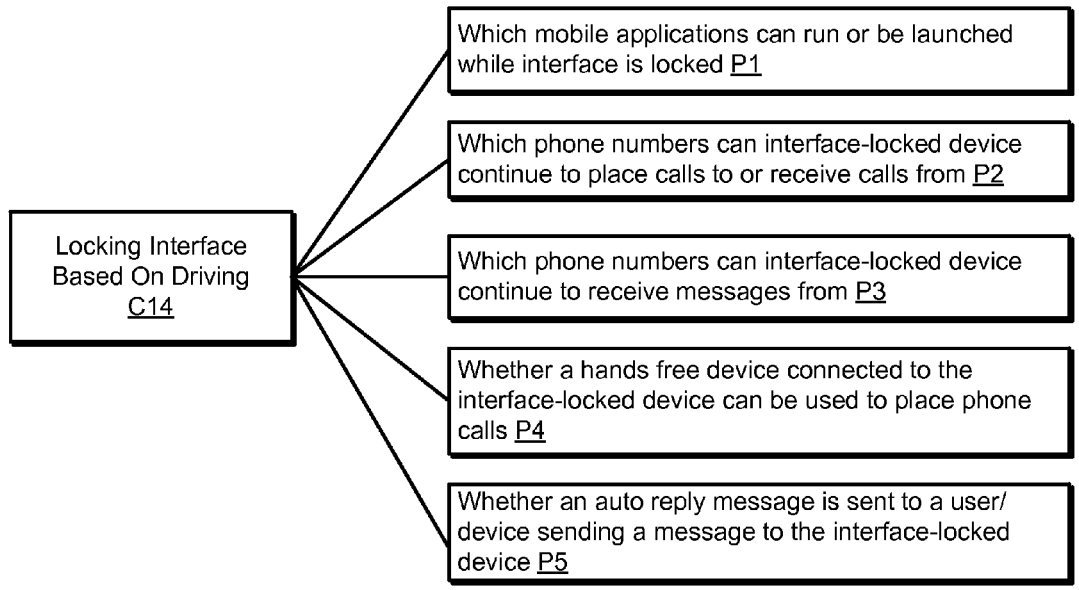
FIGS. 5C and 5D are diagrams depicting relationships between example functional components and related parameters supported by a particular mobile device implementing the client state manager of FIG. 1.
Figure 5D:
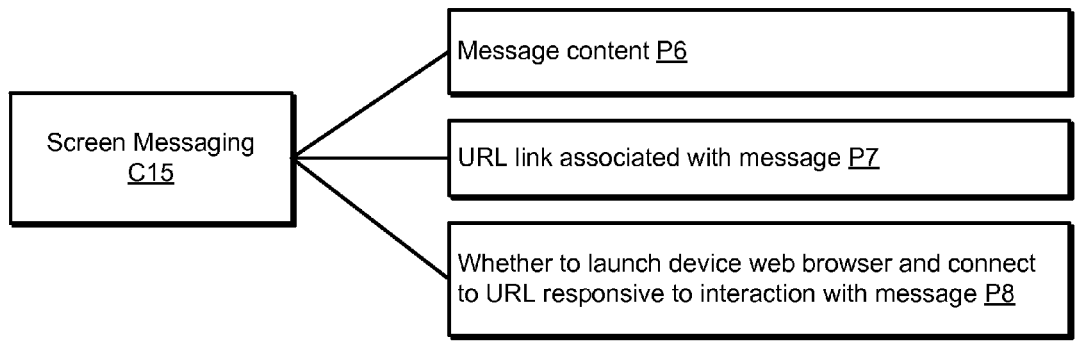

Referring to Table 5 and FIGS. 5C and 5D, particular enabled features and capabilities allow setting of parameters by a third party application. For example as shown in FIG. 5C, a third party application enabling the locking interface based on driving capability C14 can set: 1) parameter P1 to select applications which can run when device interface is locked, 2) parameter P2 to select phone numbers which interface-locked device can continue to place calls to or receive calls from, 3) parameter P3 to select phone numbers from which the interface-locked device can continue to receive messages (e.g. SMS) from, 4) parameter P4 to select whether a hands free device connected to the interface-locked device (e.g. Bluetooth headset) can be used to place phone calls, and 5) parameter P5 to select whether an auto reply message is sent to a user/device sending a message (e.g. SMS) to the interface-locked device. As shown in Table 5, parameters P1 through P5 are also applicable to capability C13, locking interface based on time schedule, and feature F8, device interface locking control. As shown in FIG. 5D, a third party application enabling the screen messaging capability C15 can set: 1) parameter P6 to specify message content, 2) parameter P7 to specify a URL link associated with a specified message, and 3) parameter P8 to select whether to launch a device web browser and connect to a specified URL responsive to user interaction with a specified message (e.g. user clicking on message).

Figure 6:
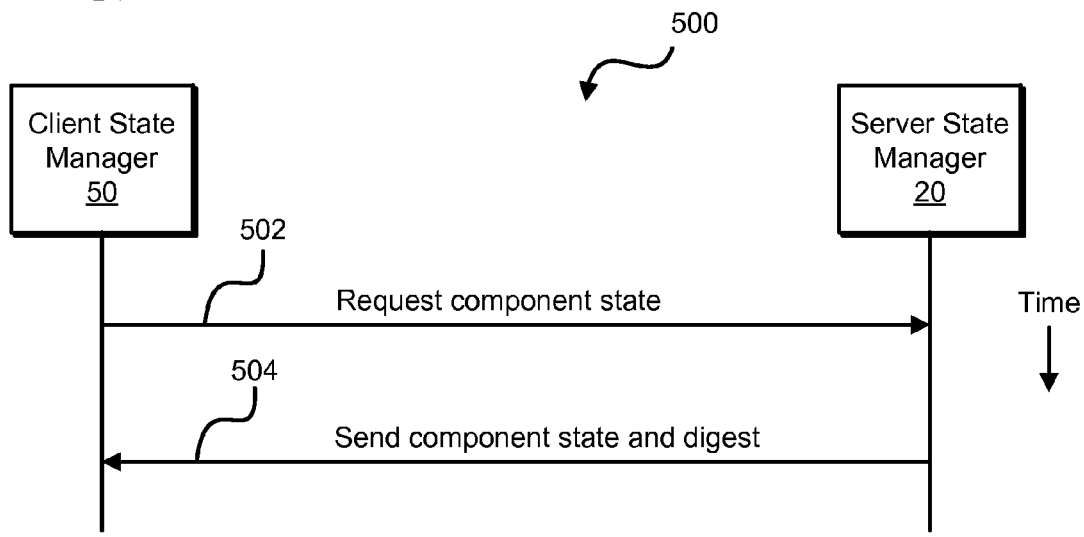
FIGS. 6-9 are illustrative communication flows between the client state manager and the server state manager of FIG. 1.

Referring to FIG. 6, an illustrative communication flow 500 between the client state manager 50 and the server state manager 20 is shown. The communication flow 500 can occur for example responsive to mobile device startup, responsive to initiation of the client state manager 50, responsive to other event, or at predetermined scheduled time intervals (also termed herein as "heartbeat" communications). In a synchronous communication 502, the client state manager 50 transmits a request for a particular functional component server state. In a synchronous communication 504, the server state manager 20 transmits ("sends") the particular functional component server state and server digest responsive to the state request. The communications 502, 504 can be substantially continuous as a single communication or separated by an interval of time.

Figure 7:
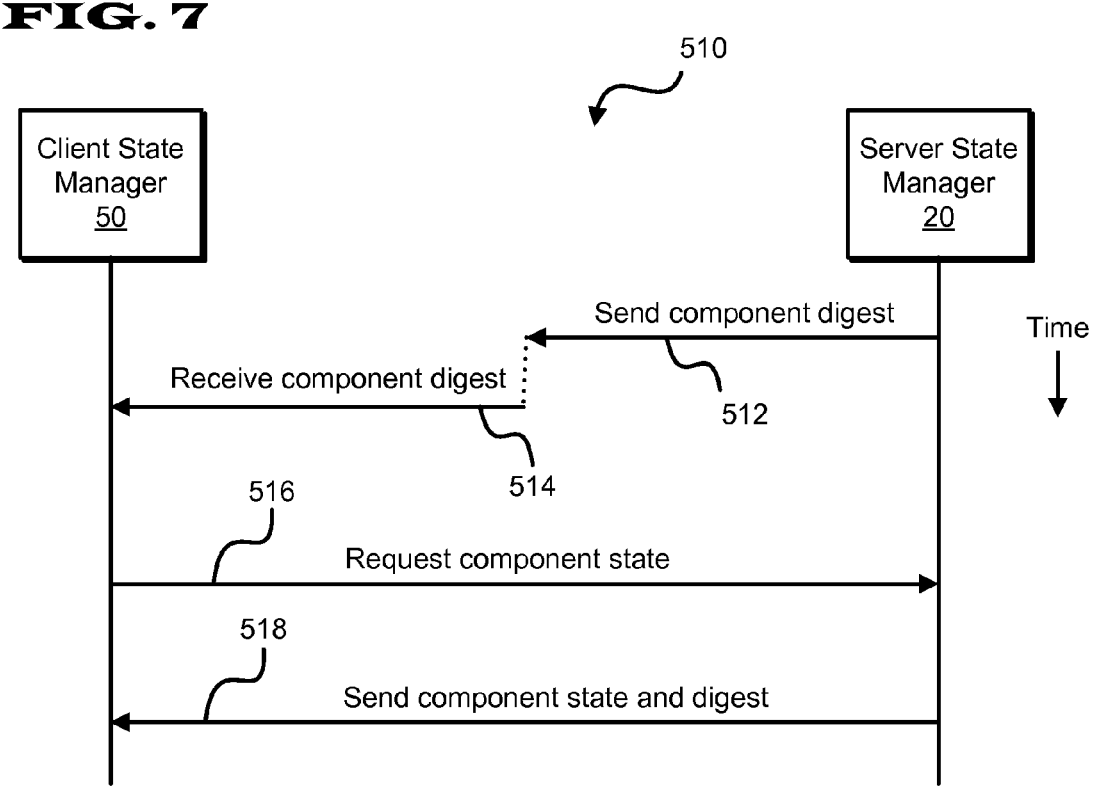

Referring to FIG. 7, another illustrative communication flow 510 between the client state manager 50 and the server state manager 20 is shown. In an asynchronous communication 512, 514, the server state manager 20 transmits an updated functional component server digest (communication 512) and the client state manager 50 receives the updated functional component server digest (communication 514). Communication 512 may be initiated by the server state manager 20 in response to a server state update, for example in response to an application request to modify the status of a functional component. In a synchronous communication 516, the client state manager 50 transmits a state request responsive to a determination of a difference between the transmitted server digest and a corresponding client digest. In a synchronous communication 518, the server state manager 20 transmits the particular functional component server state and server digest responsive to the state request. One or more server digests can be sent in the communication 512, wherein the client state manager 50 transmits a state request corresponding to those states for which there is a determined difference between the transmitted server digest and a corresponding client digest (communication 516), and the server state manager 20 transmits one or more states and one or more digests corresponding to the state request (communication 518).

Figure 8:
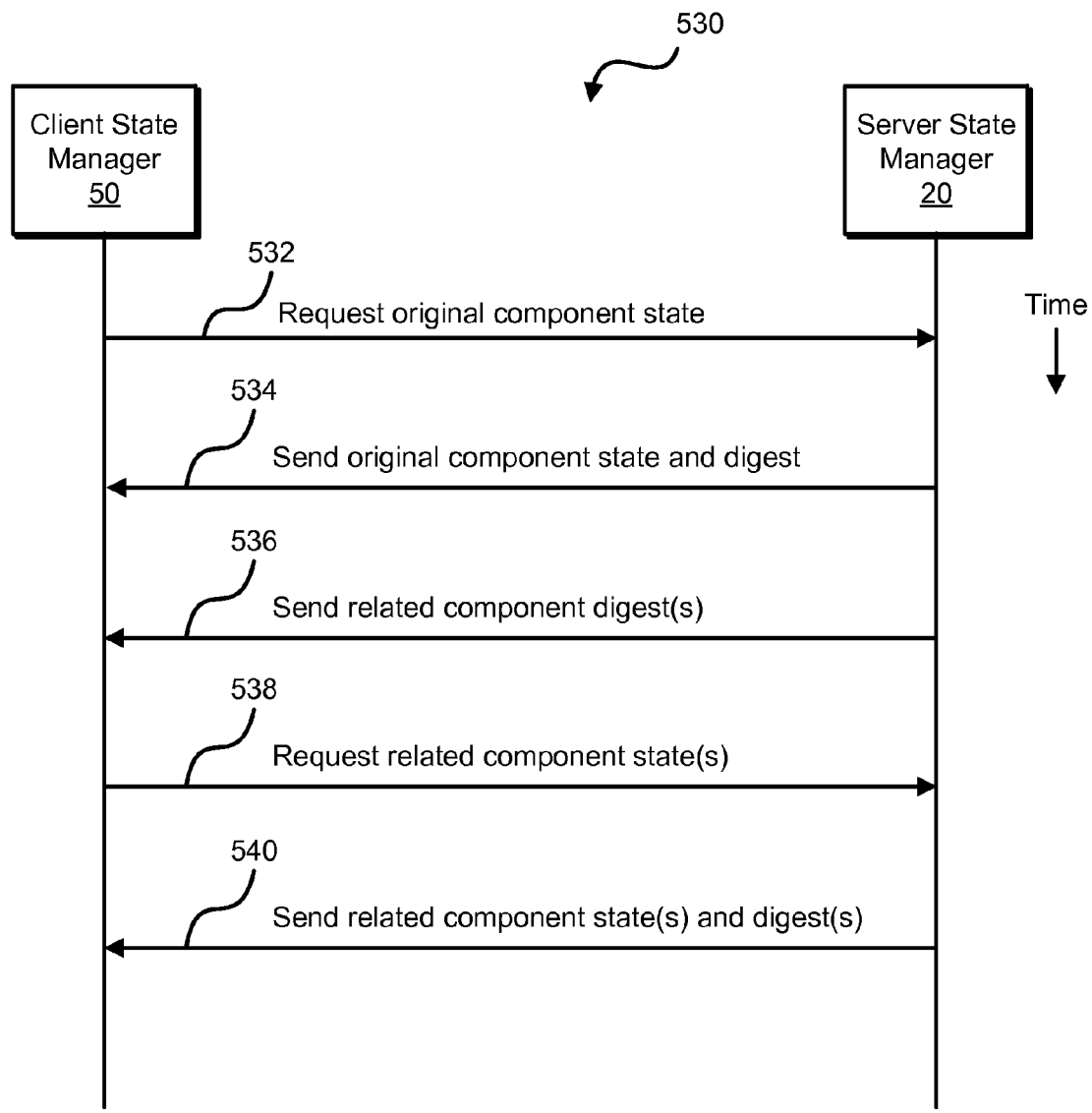

Referring to FIG. 8, another illustrative communication flow 530 between the client state manager 50 and the server state manager 20 is shown. In a synchronous communication 532 the client state manager 50 transmits a first state request corresponding to a particular state and particular functional component. The first state request can be transmitted by the client state manager 50 for example responsive to a determination of a difference between a received server digest and a corresponding client digest for the particular state, which server digest can be received for example in the manner shown in asynchronous communication 512, 514 of FIG. 7. Alternatively, the first state request (communication 532) can be transmitted by the client state manager 50 for example responsive to mobile device startup, responsive to initiation of the client state manager 50, responsive to other event, or at predetermined scheduled time intervals, as described above with reference to FIG. 6. In a synchronous communication 534, the server state manager 20 transmits the particular functional component server state and server digest responsive to the first state request. In a synchronous communication 536 responsive to the first state request, the server state manager 20 transmits another server digest corresponding to a related server state and a related functional component which is related to the particular functional component corresponding to the first state request. The communications 534, 536 can be substantially continuous as a single communication or separated by an interval of time with communication 534 or communication 536 first in time. In a synchronous communication 538, the client state manager 50 transmits a second state request corresponding to the related server state responsive to a determination of a difference between the related server digest and a corresponding client digest. In a synchronous communication 540, the server state manager 20 transmits the related functional component server state and server digest responsive to the second state request. One or more states can be requested by the client state manager 50 in communications 532 and 538, and one or more states or digests can be transmitted by the server state manager in communications 534, 536 and 540.

A non-limiting example pursuant to the communication flows 510 and 530 of FIGS. 7 and 8 follows. A $3^{rd}$ party application 70 transmits a request to the server state manager 20 to enable the location streaming capability C1 and on demand location requesting capability C2. Referring to Table 3, the capabilities C1 and C2 are related to the location data access feature F1. Accordingly, states and digests corresponding to functional components C1, C2 and F1 are updated by the state update engine 32 and digest generation engine 30. The server state manager 20 transmits the server digest corresponding to the functional component F1 to the client state manager 50, for example as shown in communication 512, 514. The client state manager 50 transmits a request to the server state manager 20 for the server state corresponding to functional component F1 responsive to a determination of a difference between the received server digest for component F1 and the corresponding client digest (e.g. communication 532). The server state manager 20 transmits the server state corresponding to feature F1 and the updated server digests corresponding to capabilities C1 and C2 (e.g. communications 534, 536). The client state manager 50 transmits a second state request corresponding to the server states for capabilities C1 and C2 responsive to a determination of a difference between the received server digests for capabilities C1 and C2 and the corresponding client digests (e.g. communication 538) stored in the client digest database 58. The server state manager 20 transmits the component server states and server digests for capabilities C1 and C2 responsive to the second state request (e.g. communication 540) which are subsequently stored as the respective client states in the client state database 56.

Figure 9:
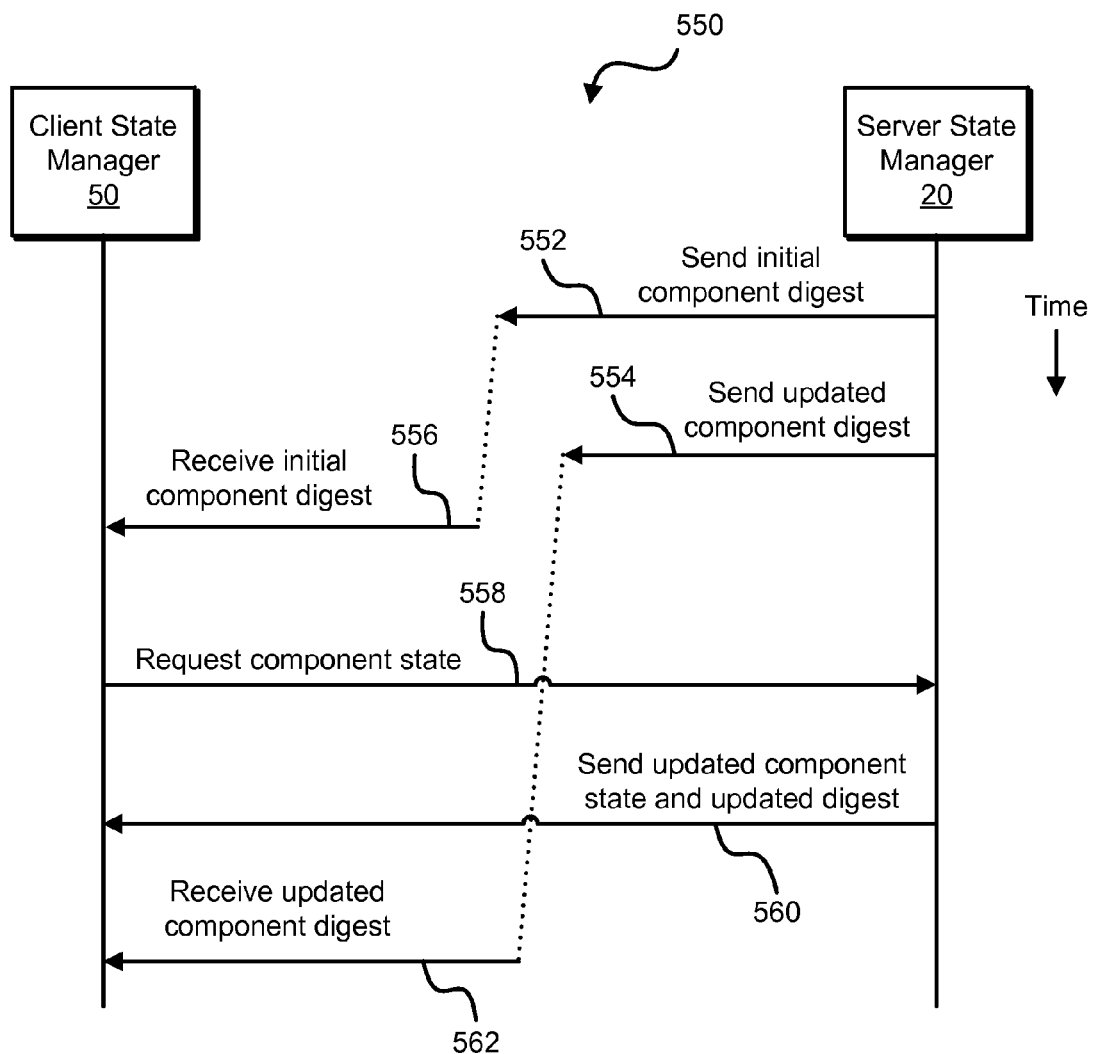

Referring to FIG. 9, another illustrative communication flow 550 between the client state manager 50 and the server state manager 20 is shown. In an asynchronous communication 552, 556, the server state manager 20 transmits an initial functional component server digest corresponding to a particular functional component (communication 552), and the client state manager 50 receives the initial functional component server digest (communication 556). At some point after transmitting the initial server digest, the server state manager 20 updates the status of the server state corresponding to the particular functional component, for example in response to an application request. Responsive to the update, in a second asynchronous communication the server state manager 20 transmits an updated functional component server digest corresponding to the particular functional component (communication 554), and the client state manager 50 receives the updated functional component server digest (communication 562). Prior to receiving the updated functional component server digest, in a synchronous communication 558 the client state manager 50 transmits a state request responsive to a determination of a difference between the initial server digest and a corresponding client digest. In a synchronous communication 560, the server state manager 20 transmits the updated server state and updated server digest corresponding to the particular functional component responsive to the state request. The client state manager stores the updated server state as the client state for the particular functional component in the client state database 56, for example by caching. Upon later receiving the updated server digest in the asynchronous communication 562, the client state manager 50 compares the updated server digest with the corresponding client digest and determines no difference, wherein the client state manager 50 does not transmit an additional state request. The delays in receiving the initial and updated server digests shown in FIG. 9 can result for example from network delays. A benefit of the invention illustrated by the communication flow 550 is that storing of digests by the client state manager 50, results in fewer required synchronous requests, even when network behavior causes asynchronous communications to arrive out of order or after a delay, thereby conserving network bandwidth, system resources and mobile device battery charge.

Figure 10:
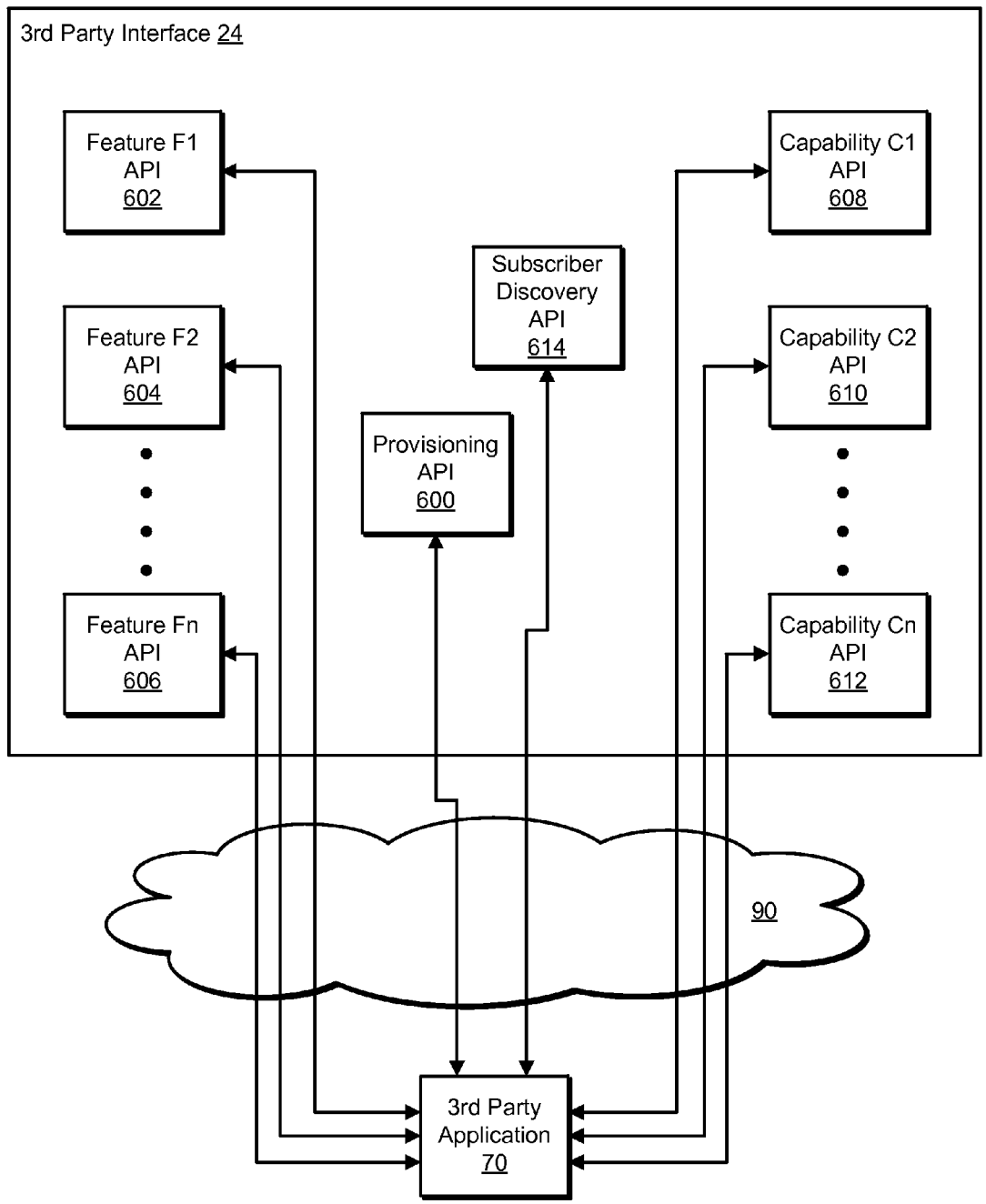
FIG. 10 is a diagram depicting application program interfaces ("APIs") enabled by an interface of the server state manager of FIG. 1.

Referring to FIGS. 1 and 10, the third party interface 24 of the server state manager 20 enables a plurality of application program interfaces ("APIs") accessible to a third party application 70. In an initial provisioning process, an application provisioning engine 34 generates an access control list which is stored in an access control list ("ACL") database 38 restricting which features F1-Fn and capabilities C1-Cn can be used by the third party application 70, and credentials are provided to the third party application 70 consistent with the access control list via the provisioning API 600. Each feature F1-Fn is tied to an API 602, 604, 606 and each capability is tied to an API 608, 610 and 612. Alternatively, APIs corresponding to any suitable functional components can be enabled.

The third party interface 24 receives API requests from the third party application 70 and one or more credentials which are used by the server state manager 20 to identify the application 70 via the credential identification engine 40 and determine its corresponding access control list from the ACL database 38. An API request from an application 70 for a particular capability API 608, 610, 612 will be rejected unless the application's access control list indicates that the application has use rights for the particular capability C1-Cn. An API request from an application 70 for a particular feature API 602, 604, 606 will be rejected unless the application's access control list indicates that the application 70 has use rights for the particular feature or at least one capability C1-Cn related to the feature.

Using a subscriber discovery API 614, the third party application 70 can query which mobile devices are implementing the client state manager 50 and in communication with the server state manager 20. Preferably, the third party application 70 provides a mobile device phone number or other user ("subscriber") identifier or mobile device identifier via the subscriber discovery API 614 to initiate a query regarding the mobile device. The third party application 70 can also query which functional components (e.g. features and capabilities) are enabled or available on a particular mobile device. The third party application 70 can use this information to determine whether a client state manager 50 needs to be installed or upgraded on a particular mobile device.

A third party application 70 which requires access or control of a particular mobile device via the client state manager 50 is preferably required to obtain consent from a user with authority to make privacy decisions for the particular mobile device. Before accessing controls of a functional component API such as the feature APIs 602, 604, 606 or capability APIs 608, 610, 612, for example to modify status of a functional component, a third party application 70 must record the user consent with the particular functional component API. The consent is verified by a consent verification engine 42. In the absence of user consent, access to the particular functional component API will be rejected by the consent verification engine 42.

Because the server state manager 20 supports more than one third party application 70 controlling a particular mobile device running the client state manager 50, the server state manager 20 is configured to resolve conflicts and ambiguities among application requests. The server state manager can set priorities for the third party applications 70 wherein for a particular mobile device the request of an application 70 with a higher priority can override the request of an application 70 with a lower priority. For example, a request from a higher priority application 70 to enable location streaming capability C1 can override a request from a lower priority application 70 to disable location streaming.

In a registration process when the client state manager 50 is initially executed on a mobile device, the client state manager 50 communicates identifying information and which functional components (e.g. features, capabilities, settings and resources) it supports to the server state manager 20. A client provisioning engine 44 generates a unique token which the server state manager 20 transmits to the client state manager 50 via the synchronous interface 52 to be used by the client state manager 50 in subsequent communications with the server state manager 20, ensuring that the mobile device running the client state manager 50 can be reliably authenticated. During the registration process, the server state manager 20 also preferably transmits a cryptographically secure code to the client state manager 50 via SMS or other telephone number-specific protocol. The client state manager 50 transmits this code back to the server state manager 20 to prove the validity of the mobile device's phone number and allow the server state manager 20 to use the client state manager 50 to interact with functional components associated with the phone number.

The client state manager 50 preferably periodically sends notification messages to the server state manager 20. These messages can indicate that the mobile device is operational and that the client state manager 50 is active and enabled. Messages can also include updates regarding which functional components are currently supported on the mobile device.

Given appropriate access control permissions, mobile device user consent, and functional component status, a third party application 70 can cause the client state manager 50 to send notifications with subscriber-specific data to the server state manager 20. The subscriber-specific data preferably includes mobile device use data gathered by the mobile device during use. Referring to the capabilities shown in Table 3, data transmitted from the client state manager 50 to the server state manager 20 can include for example mobile device location data (capabilities C1 and C2) and SMS, MMS and voice call activity data (capabilities C3-C8), application installation activity (capability C11), and contact activity (capability C12). Other capabilities, for example forcing GPS on if off (C10), locking a mobile device interface based on time schedule or driving (capabilities C13 and C14), and mobile device screen messaging (capability C15), enable an application 70 to control a mobile device without causing transmission of subscriber-specific data from the client state manager 50 to the server state manager 20.

The server state manager 20 stores received subscriber-specific data in the subscriber database 36 for a predetermined time period to permit gathering by an authorized application 70. The server state manager 20 is configured to stream mobile device location to an application 70 per capability C1 and to transmit on demand location requests from an application 70 to a mobile device per capability C2. The server state manager 20 is further configured to enable an authorized application 70 to gather mobile device incoming and outgoing messaging activity per capabilities C3-C6. The server state manager 20 is further configured to enable an authorized application 70 to gather mobile device incoming and outgoing voice call activity per capabilities C7 and C8. The server state manager 20 is further configured to enable an authorized application 70 to gather indications of applications installed on a mobile device per capability C11 and to gather indications of mobile device subscriber contacts per capability C12. The server state manager 20 is further configured to enable an authorized application 70 to gather an indication of whether GPS functionality is enabled or disabled on the mobile device per capability C9, and to transmit instructions from the application 70 to the client state manager 50 to enable if off GPS functionality on the mobile device per capability C10.

An authorized third party application 70 can query the subscriber database 36 via the third party interface 24, for example via a RESTful API enabled by the server state manager 20. The server state manager 20 can further implement Simple Update Protocol (SUP) or other suitable protocol for notifying an authorized third party application 70 when updates to subscriber-specific data are available. The third party interface 24 is further preferably configured to receive preference indications from a third party application 70 regarding what subscriber-specific data it requires and at what frequency or under what circumstances. In such manner the server state manager 20 preferably supports a publish-subscribe model in which an application 70 subscribes to a particular type of subscriber-specific data and receives notifications from the server state manager 20 when such data becomes available.

Figure 11:
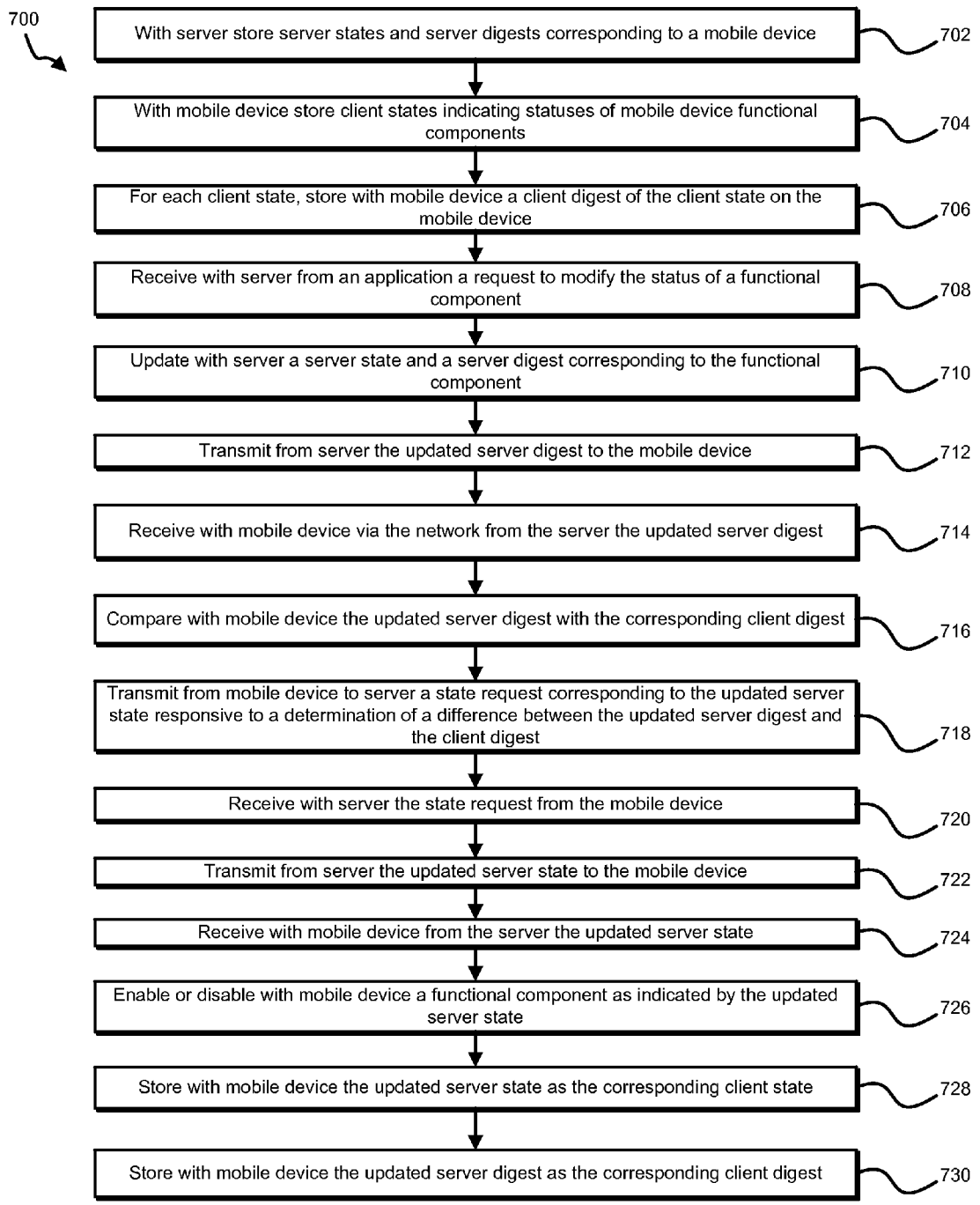
FIGS. 11 and 12 are diagrams showing methods for enabling control of mobile device functional components.

Referring to FIG. 11, a diagram shows a method 700 for enabling control of mobile device functional components. The method includes storing with a server within the network a plurality of server states and a plurality of server digests respectively corresponding to the plurality of server states, wherein the server states and the server digests correspond to a particular mobile device (step 702). A plurality of client states are stored with the mobile device indicating statuses of functional components of the mobile device, wherein each of the plurality of client states corresponds to at least one of the functional components (step 704). For each of the plurality of client states, a client digest of the client state is stored with the mobile device (step 706). A request to modify the status of at least one of the functional components of the mobile device is received with the server from an application via the network (step 708). The method further includes updating with the server at least one of the server states and at least one of the server digests corresponding to the at least one of the functional components of the mobile device responsive to the request from the application to modify the status of the at least one of the functional components (step 710). The at least one updated server digest is transmitted from the server to the mobile device via the network (step 712). The at least one updated server digest is received with the mobile device via the network from the server, wherein the at least one updated server digest corresponds to at least one of the client digests (step 714). The at least one updated server digest is compared with the corresponding at least one client digest with the mobile device (step 716). A state request corresponding to the at least one updated server state is transmitted from the mobile device to the server via the network responsive to a determination of a difference between the at least one updated server digest and the corresponding at least one client digest (step 718). The state request is received with the server from the mobile device (step 720). The at least one updated server state is transmitted from the server to the mobile device (step 722). The at least one updated server state is received with the mobile device from the server via the network (step 724).

At least one of the functional components is enabled or disabled with the mobile device as indicated by the received at least one updated server state (step 726). The received at least one updated server state is stored with the mobile device as the corresponding at least one client state (step 728), and the received at least one updated server digest is stored with the mobile device as the corresponding at least one client digest (step 730).

Figure 12:
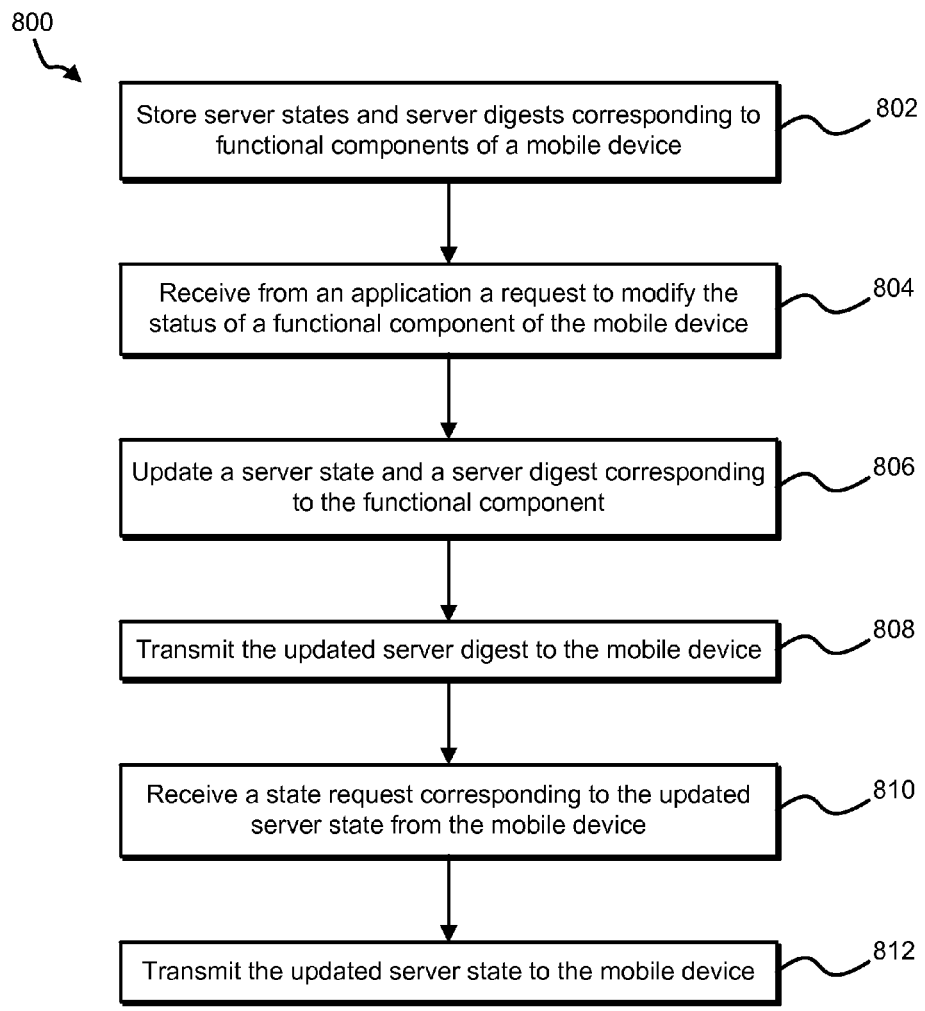

Referring to FIG. 12, a diagram shows a method 800 for enabling control of mobile device functional components. The method includes providing a server within a network, wherein the server comprises at least one computing system within the network. A plurality of server states and a plurality of server digests respectively corresponding to the plurality of server states corresponding to functional components of a particular mobile device are stored with the server (step 802). A request to modify the status of at least one of the functional components of the particular mobile device is received with the server from an application via the network (step 804). At least one server state and at least one server digest corresponding to the at least one of the functional components of the particular mobile device are updated with the server responsive to the request from the application to modify the status of the at least one of the functional components (step 806). The at least one updated server digest is transmitted with the server to the particular mobile device (step 808). A state request corresponding to the at least one updated server state is received with the server from the particular mobile device (step 810); and at least one updated server state is transmitted to the particular mobile device responsive to the state request (step 812).

While embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A system comprising a non-transitory computer readable storage medium having encoded thereon instructions that, when executed on a processor of a mobile device, cause the mobile device to perform the following:

store a plurality of client states indicating statuses of functional components of the mobile device, wherein each of the plurality of client states corresponds to at least one of the functional components;

for each of the plurality of client states, store a client digest of the client state on the mobile device;

receive via a network from a server periodic transmissions of a particular server digest corresponding to a particular one of a plurality of server states maintained by the server, which server states indicate statuses of functional components of the mobile device, wherein the particular server digest further corresponds to one of the plurality of client digests;

compare the particular server digest with the corresponding client digest;

transmit to the server via the network a state request corresponding to the particular one of a plurality of server states responsive to a determination of a difference between the particular server digest and the corresponding client digest;

receive from the server via the network the particular one of the plurality of server states;

enable or disable at least one of the functional components as indicated by the received particular one of the plurality of server states;

store the received particular one of the plurality of server states as the corresponding client state; and
store the received particular server digest as the corresponding client digest.

2. The system of claim 1, wherein the instructions further cause the mobile device to transmit mobile device use data to the server responsive to enabling the at least one of the functional components.

3. The system of claim 1, wherein the instructions further cause the mobile device to perform the following:
receive from the server via the network the particular one of the plurality of server states with the particular server digest.

4. The system of claim 3, wherein the instructions further cause the mobile device to perform the following:
receive from the server an updated server digest corresponding to an updated server state;
compare the updated server digest with the corresponding client digest;
transmit to the server via a network a state request responsive to a determination of a difference between the updated server digest and the corresponding client digest; and
receive from the server via the network a re-updated server state and a corresponding re-updated server digest responsive to the state request, wherein the re-updated server state was re-updated after transmission from the server of the updated server digest.

5. The system of claim 4, wherein the instructions further cause the mobile device to perform the following:
receive from the server the updated server digest in an asynchronous transmission;
receive from the server the re-updated server state and the re-updated server digest in a synchronous transmission;
store the re-updated server digest received in the synchronous transmission as the corresponding client digest;
receive the re-updated server digest in an asynchronous transmission after receiving the re-updated server state and the re-updated server digest in the synchronous transmission, wherein the asynchronous transmission of the re-updated server digest was initiated by the server prior to initiation of the synchronous transmission; and
compare the re-updated server digest received in the asynchronous transmission with the corresponding client digest;
refrain from transmitting to the server a state request responsive to a determination that the re-updated server digest received in the asynchronous transmission and the corresponding client digest are the same.

6. The system of claim 1, wherein the particular server digest is determined by the corresponding server state and a hash function.

7. The system of claim 1, wherein the statuses of the functional components of the mobile device comprise an indication of whether a particular functional component is enabled or disabled.

8. The system of claim 1, wherein the statuses of the functional components of the mobile device comprise an indication of at least one scheduled time period when a particular functional component is enabled or disabled.

9. The system of claim 1, further comprising the server which is configured to:
for a particular mobile device encoded with the instructions store a plurality of server states and a plurality of server digests respectively corresponding to the plurality of server states;
receive from an application a request to modify the status of at least one of the functional components of the particular mobile device;
update at least one server state and at least one server digest corresponding to the at least one of the functional components of the particular mobile device responsive to the request from the application to modify the status of the at least one of the functional components;
transmit the at least one updated server digest to the particular mobile device;
receive the state request corresponding to the at least one updated server state from the particular mobile device; and
transmit the at least one updated server state to the particular mobile device responsive to the state request.

10. The system of claim 9, wherein the server is further configured to:
render a plurality of the functional components controllable by the application through a network, wherein each of the functional components corresponds to an application program interface ("API") accessible to the application;
store an indication of which of the plurality of functional components are controllable by the application;
receive from the application a credential and identify the application via the received credential; and
provide the application access to a particular API responsive to the credential identifying the application as an application authorized to access the functional component corresponding to the particular API.

11. The system of claim 9, wherein the server is further configured to:
receive from the application an indication of a mobile device user consent, which user consent comprises a consent to modify the status of the at least one of the functional components of the particular mobile device; and
update the at least one server state and the at least one server digest corresponding to the at least one of the functional components of the particular mobile device responsive to the user consent.

12. The system of claim 9, wherein the server is further configured to:
receive from the application a request to provide identifiers of mobile devices encoded with the instructions; and
transmit the identifiers to the application responsive to the request to provide the identifiers.

13. The system of claim 9, wherein the server is configured to receive the request to modify the status of at least one of the functional components of the particular mobile device from an application executed on the particular mobile device.

14. The system of claim 9, wherein the server is configured to receive the request to modify the status of at least one of the functional components of the particular mobile device from an application executed on a computer in communication with the server via a network.

15. The system of claim 9, wherein the server is further configured to transmit the at least one updated server digest to the mobile device in an asynchronous communication and transmit the at least one updated server state to the mobile device in a synchronous communication.

16. The system of claim 15, wherein the server is further configured to transmit the at least one updated server digest using Short Message Service ("SMS") protocol.

17. The system of claim 15, wherein the server is further configured to transmit the at least one updated server state using Hypertext Transfer Protocol Secure ("HTTPS").

18. The system of claim 9, wherein the server is further configured to:
- transmit, responsive to the state request from the particular mobile device corresponding to the at least one updated server state corresponding to the at least one of the functional components, at least one other updated digest corresponding to at least one other updated state corresponding to at least one other functional component;
- receive another state request from the particular mobile device corresponding to the at least one other updated server state; and
- transmit the at least one other updated server state to the particular mobile device responsive to the another state request.

19. The system of claim 9, wherein the server is further configured to:
- receive from an application a request to modify the status of a first functional component of the particular mobile device;
- update the server state and the server digest corresponding to the first functional component of the particular mobile device responsive to the request from the application to modify the status of the first functional component;
- update the server state and the server digest corresponding to a second functional component of the particular mobile device related to the first functional component responsive to the request from the application to modify the status of the first functional component;
- transmit to the particular mobile device the updated server digest corresponding to the first functional component;
- receive a first state request from the particular mobile device responsive to the transmission of the updated server digest corresponding to the first functional component;
- transmit to the particular mobile device the updated server state corresponding to the first functional component responsive to the first state request;
- transmit to the particular mobile device the updated server digest corresponding to the second functional component responsive to the first state request;
- receive a second state request from the particular mobile device responsive to the transmission of the updated server digest corresponding to the second functional component; and
- transmit to the particular mobile device the updated server state corresponding to the second functional component responsive to the second state request.

20. The system of claim 9, wherein a plurality of the functional components comprise capabilities and another plurality of the functional components comprise features, wherein the server is further configured to:
- group the capabilities into a plurality of capability groups, wherein each of the capability groups enables a feature, wherein at least one of the plurality of capability groups includes a plurality of the capabilities;
- receive from the application a request to modify a status of a feature;
- update the server state and server digest of the feature consistent with the request to modify the status of the feature; and
- for each capability grouped with the feature and requiring change to effect the modified status of the feature, update the server state and server digest corresponding to the capability.

21. The system of claim 20, wherein the status of the feature comprises an indication of whether the feature is enabled or disabled.

22. The system of claim 20, wherein the status of the feature comprises an indication of a scheduled time period when the feature is enabled or disabled.

23. The system of claim 20, wherein the feature is a location feature and the server is configured to enable and disable the location feature and corresponding capabilities for controlling dissemination of location information of the mobile device to the application, wherein the location feature comprises the following capabilities:
- mobile device location streaming to the application from the server; and
- on demand location requests to the mobile device from the application from the server.

24. The system of claim 20, wherein the feature is a messaging feature and the server is configured to enable and disable the messaging feature and corresponding capabilities for controlling dissemination of messaging information of the mobile device to the application, wherein the messaging feature comprises the following capabilities:
- gathering by the application of mobile device incoming messaging activity from the server; and
- gathering by the application of mobile device outgoing messaging activity from the server.

25. The system of claim 20, wherein the feature is a call activity feature and the server is configured to enable and disable the call activity feature and corresponding capabilities for controlling dissemination of call activity information of the mobile device to the application, wherein the call activity feature comprises the following capabilities:
- gathering by the application of mobile device incoming call activity from the server; and
- gathering by the application of mobile device outgoing call activity from the server.

26. The system of claim 20, wherein the feature is a contact database feature and the server is configured to enable and disable the contact database feature and a corresponding capability for controlling dissemination of contact information of the mobile device to the application, wherein the contact database feature comprises the following capability:
- gathering by the application of mobile device user contact information from the server.

27. The system of claim 20, wherein the feature is a Global Positioning System ("GPS") feature and the server is configured to enable and disable the GPS feature and corresponding capabilities, wherein the GPS feature comprises the following capabilities:
- detecting by the application via the server whether GPS functionality is enabled or disabled on the mobile device; and
- enabling and disabling by the application via the server GPS functionality on the mobile device.

28. The system of claim 20, wherein the server is further configured to:
- render a plurality of features accessible through a network, wherein each of the features corresponds to an application program interface ("API");
- store an indication of which of the plurality of features are available to the application;
- receive from the application a credential and identify the application via the received credential; and
- provide the application access to a particular API responsive to the credential identifying the application as an application authorized to access the feature corresponding to the particular API.

29. The system of claim 9, wherein a plurality of the functional components comprise capabilities and another plurality of the functional components comprise features, wherein the server is further configured to:

group the capabilities into a plurality of capability groups, wherein each of the capability groups enables a feature, wherein at least one of the plurality of capability groups includes a plurality of the capabilities;

receive from the application a request to modify a status of a capability;

update the server state and the server digest of the capability consistent with the request to modify the status of the capability; and update the server state and the server digest corresponding to the feature enabled by the capability group corresponding to the capability for which the request to modify status was received.

30. A method for enabling control of mobile device functional components comprising:

storing with a server within the network a plurality of server states and a plurality of server digests respectively corresponding to the plurality of server states, wherein the server states and the server digests correspond to a particular mobile device;

storing with the mobile device a plurality of client states indicating statuses of functional components of the mobile device, wherein each of the plurality of client states corresponds to at least one of the functional components;

for each of the plurality of client states, storing with the mobile device a client digest of the client state on the mobile device;

receiving with the server from an application via the network a request to modify the status of at least one of the functional components of the mobile device;

updating with the server at least one of the server states and at least one of the server digests corresponding to the at least one of the functional components of the mobile device responsive to the request from the application to modify the status of the at least one of the functional components;

transmitting from the server the at least one updated server digest to the mobile device via the network;

receiving with the mobile device via the network from the server the at least one updated server digest, wherein the at least one updated server digest corresponds to at least one of the client digests;

comparing with the mobile device the at least one updated server digest with the corresponding at least one client digest;

transmitting from the mobile device to the server via the network a state request corresponding to the at least one updated server state responsive to a determination of a difference between the at least one updated server digest and the corresponding at least one client digest;

receiving with the server the state request from the mobile device;

transmitting from the server the at least one updated server state to the mobile device;

receiving with the mobile device from the server via the network the at least one updated server state;

enabling or disabling with the mobile device at least one of the functional components as indicated by the received at least one updated server state;

storing with the mobile device the received at least one updated server state as the corresponding at least one client state; and storing with the mobile device the received at least one updated server digest as the corresponding at least one client digest.

31. The method of claim 30, further comprising after transmitting the at least one updated server digest with the server to the mobile device, receiving with the server from an application via the network an additional request to modify the status of at least one of the functional components of the mobile device;

re-updating with the server the at least one of the server states and the at least one of the server digests corresponding to the at least one of the functional components of the mobile device responsive to the additional request from the application;

transmitting from the server the at least one re-updated server state and the at least one re-updated server digest responsive to the state request; and receiving with the mobile device from the server via the network the re-updated server state and the re-updated server digest.

32. The system of claim 31, further comprising:

transmitting from the server the at least one re-updated server digest in an asynchronous transmission;

receiving with the server the state request from the mobile device after transmitting from the server the at least one re-updated server digest in the asynchronous transmission;

transmitting from the server the at least one re-updated server state and the at least one re-updated server digest in a synchronous transmission responsive to the state request;

receiving with the mobile device from the server the at least one re-updated server state and the at least one re-updated server digest in the synchronous transmission;

storing with the mobile device the at least one re-updated server digest received in the synchronous transmission as the corresponding client digest;

receiving with the mobile device the at least one re-updated server digest in the asynchronous transmission after receiving the at least one re-updated server state and the at least one re-updated server digest in the synchronous transmission, wherein the asynchronous transmission of the re-updated server digest was initiated by the server prior to initiation of the synchronous transmission;

comparing with the mobile device the re-updated server digest received in the asynchronous transmission with the corresponding client digest; and refraining from transmitting with the mobile device to the server a state request responsive to a determination that the re-updated server digest received in the asynchronous transmission and the corresponding client digest are the same.

33. A method for enabling control of mobile device functional components comprising:

providing a server within a network, wherein the server comprises at least one computing system within the network;

storing with the server a plurality of server states and a plurality of server digests respectively corresponding to the plurality of server states corresponding to functional components of a particular mobile device;

receiving with the server from an application via the network a request to modify the status of at least one of the functional components of the particular mobile device;

updating with the server at least one server state and at least one server digest corresponding to the at least one of the functional components of the particular mobile device responsive to the request from the application to modify the status of the at least one of the functional components;

transmit with the server the at least one updated server digest to the particular mobile device;

receive with the server a state request corresponding to the at least one updated server state from the particular mobile device; and transmit the at least one updated server state to the particular mobile device responsive to the state request.

34. The method of claim 33, wherein the request to modify the status of the at least one functional component comprises a request to enable the at least one functional component, wherein the method further comprises:

receiving, with the server, mobile device use data corresponding to the at least one functional component enabled on the mobile device; and transmitting with the server to the application the mobile device use data corresponding to the at least one functional component.

35. The method of claim 33, wherein the request to modify the status of the at least one functional component comprises a request to modify at least one of a plurality of parameters of the functional components.

\* \* \* \* \*